A. G. Day,
Cask Air Vent,
Nº 48,377. Patented June 27, 1865.
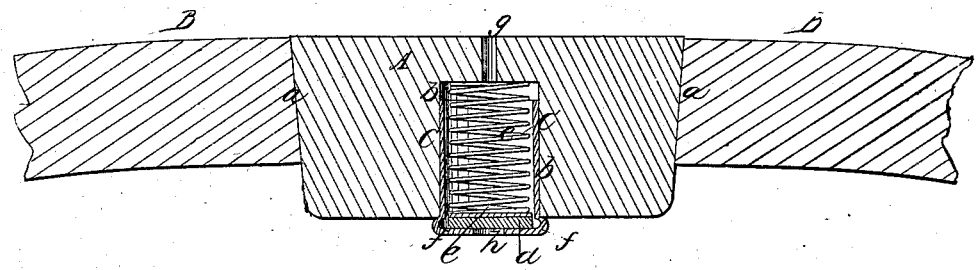
Witnesses:
Henry P. Brown
Geo. W. Reed
Inventor:
Austin G. Day

UNITED STATES PATENT OFFICE.

AUSTIN G. DAY, OF SEYMOUR, CONNECTICUT.

IMPROVED BUNG FOR BARRELS AND OTHER VESSELS.

Specification forming part of Letters Patent No. 48,377, dated June 27, 1865.

*To all whom it may concern:*

Be it known that I, AUSTIN G. DAY, of Seymour, in the county of New Haven and State of Connecticut, have invented a new and useful Improvement in Casks and other Vessels for the Transportation and Storage of Petroleum and other Liquids; and I do hereby declare that the following is a full, clear, and exact description of the same, reference being had to the accompanying drawing, forming part of this specification, said drawing representing a central section of a bung and a portion of a cask illustrating the application of my improvement.

In the transportation and storage of petroleum in casks and other vessels much loss has hitherto resulted from leakage, more especially when pressure has been created within by the expansion of the oil itself and the generation of vapors through exposure of the vessels to the heat of the sun or to a high atmospheric temperature.

In casks and other vessels hitherto made of unprepared wood this pressure has generally forced the liquid through the pores of the wood, and so found relief without bursting the vessels; but now that wooden vessels are so prepared as to render the wood impervious to the oil, and iron casks are coming into use, more serious loss is likely to result, for, as no relief from the pressure can be obtained in such vessels by the oil forcing its way through pores, the seams are liable to be opened or the heads of the vessels burst out. With a view to prevent loss in this way it has been customary to fill petroleum-barrels only to within two or three gallons of their full capacity; but this, while obviating the leakage resulting from pressure produced by the expansion of the oil itself, has little or no effect in preventing the greater leakage produced by pressure resulting from the generation of vapors, and the reduction of the practical capacity of the vessel thus occasioned is productive of considerable expense, the cost of the barrels being about ten cents per gallon, and the cost of transportation from the wells to the market being generally from five to fifteen cents per gallon. With a view to obviate this loss by leakage from such vessels I propose to make use of an automatically-opening valve to provide for the escape of naturally-generated vapors. This device may be applied to the body of the vessel; but as, for practical reasons, it is better to apply it to the bung or stopper, I have represented in the drawing such application, a description of which will serve to illustrate my invention.

A represents the bung or stopper, of wood or other material, inserted in the usual or any suitable manner into a hole, $a$, in one of the staves or any other part of the barrel or vessel B.

In the center of the bung or stopper a hole, $b$, of suitable size is bored from the interior partly through it for the reception of a metal tube, C, which contains the valve $c\ d$ and a spring, $e$, for closing it. From the center of this hole a smaller hole, $g$, is bored through to the exterior of the bung for the escape of the naturally-generated vapors. The tube C is open at its outer end; but its inner end is partly closed to form a seat, $f$, for the valve, having only a small central opening, $h$, for the pressure of the liquid within the vessel to act upon the valve, and for the escape of the vapors when the valve is raised.

The valve may be of any suitable material; but I have represented it composed of a small piece of leather, $d$, or other soft or yielding material of suitable character, to fit tightly to the valve-seat, backed with a piece of tin-plate or other metal, $c$, upon and through which the pressure of the closing-spring $e$ acts. This spring is composed of a piece of brass or other wire coiled in a suitable manner, and rests against the back or top of the hole $b$. The valve and spring having been placed in the tube C, the said tube is inserted tightly into the hole $b$ in the bung, either with or without a suitable surrounding packing of paper or other soft material before the bung is inserted into the hole $a$.

The strength of the spring $e$ should be such that it will keep the valve closed until the pressure within the barrel or other vessel is such—say from five to eight pounds per square inch—that any excess would produce an undue strain upon the joints or other parts thereof, and will then yield and allow the pressure to open the valve.

The barrel or other vessel, when filled and stoppered, should be kept during transportation or while stored, and, indeed, at all times, with the valve at the top, so that in case of the opening of the valve by the naturally-generated pressure of the contents the vapor will escape without permitting any avoidable escape of the liquid.

This invention may be applied to casks or other vessels for containing any distilled, fermented, or other liquids in which vapor or gas is likely to be naturally generated at such a pressure as to unduly strain or burst the vessels.

What I claim as my invention, and desire to secure by Letters Patent, is—

Providing in the bung or stopper or other part of a cask or other vessel for the transportation or storage of petroleum or other liquids in which vapors or gases are naturally generated a valve which operates automatically, substantially as and for the purpose herein described.

AUSTIN G. DAY.

Witnesses:
   HENRY T. BROWN,
   GEO. W. REED.